350-332
XR 3,912,977

United States Patent
Fillmore

[11] 3,912,977
[45] Oct. 14, 1975

[54] DIRECT CURRENT PROTECTION CIRCUIT

[75] Inventor: Richard Plumb Fillmore, Plainfield, N.J.

[73] Assignee: RCA Corporation, New York, N.Y.

[22] Filed: May 20, 1974

[21] Appl. No.: 471,783

[52] U.S. Cl. .................. 317/16; 317/31; 58/23 BA; 58/50 R
[51] Int. Cl.² ...................... H02H 3/24; H02H 7/10
[58] Field of Search ....... 317/16, 31, 33 VR, 33 SC, 317/53; 307/304, 251, 279; 323/DIG. 1; 331/18, 111; 58/50 R, 23 BA; 350/160 LC

[56] References Cited
UNITED STATES PATENTS

| 3,564,384 | 2/1971 | Adler | 321/2 |
| 3,708,694 | 1/1973 | Evans | 307/304 X |
| 3,739,200 | 6/1973 | D'Agostino | 307/304 |
| 3,750,383 | 8/1973 | Kakizawa | 58/50 R |
| 3,842,589 | 10/1974 | Luce et al. | 58/50 R |

Primary Examiner—J. D. Miller
Assistant Examiner—Patrick R. Salce
Attorney, Agent, or Firm—H. Christoffersen; Samuel Cohen

[57] ABSTRACT

When the oscillator which supplies the alternating drive voltage for a liquid crystal display fails, the circuit of the present application removes the direct current operating voltage from the liquid crystal driver transistors. The oscillator drives a voltage converter which produces the operating voltage. A transistor in series with the line carrying the operating voltage is controlled by the operating voltage developed by the converter so that when the oscillator fails and the converter goes off, the transistor cuts off.

6 Claims, 3 Drawing Figures

3912977
NO OR CLASSIF

DIRECT CURRENT PROTECTION CIRCUIT

This invention relates to a circuit for preventing a direct current component from developing across a load. The invention is discussed below in terms of a liquid crystal display load by way of example.

Liquid crystal displays such as the numeric indicators employed in electronic timepieces, are often driven by integrated circuits. Such circuits may be battery operated and they apply unipolarity alternating voltages to the backplate and segments of the display. The backplate may receive, for example, a relatively low frequency unipolarity voltage of one phase and the segments may receive a signal of the same frequency which is either in-phase with or out-of-phase with the backplate voltage. It sometimes occurs that the oscillator for the circuit, that is, the generator of the low-frequency unipolarity voltage, fails while the battery serving as the operating voltage source for the integrated circuit still is producing a substantial direct voltage level. Under these circumstances, that is, the oscillator inoperative and the battery still providing operating voltage, direct voltages may develope across certain segments of the display and the backplate of the display and these static voltages may seriously affect the life of the liquid crystal.

In the circuit of the present application when the oscillations produced by the oscillator cease, the direct voltage is interrupted. The circuit producing the direct voltage includes a voltage converter operated by the oscillations. A switch in series with the line carrying this voltage is controlled by the voltage developed between the operating voltage terminal of the converter and the output terminal of the converter. When oscillations are present, this voltage keeps the switch closed and when the oscillations terminate, the switch opens.

The invention is discussed in detail below and is illustrated in the drawing of which:

Figure 1:
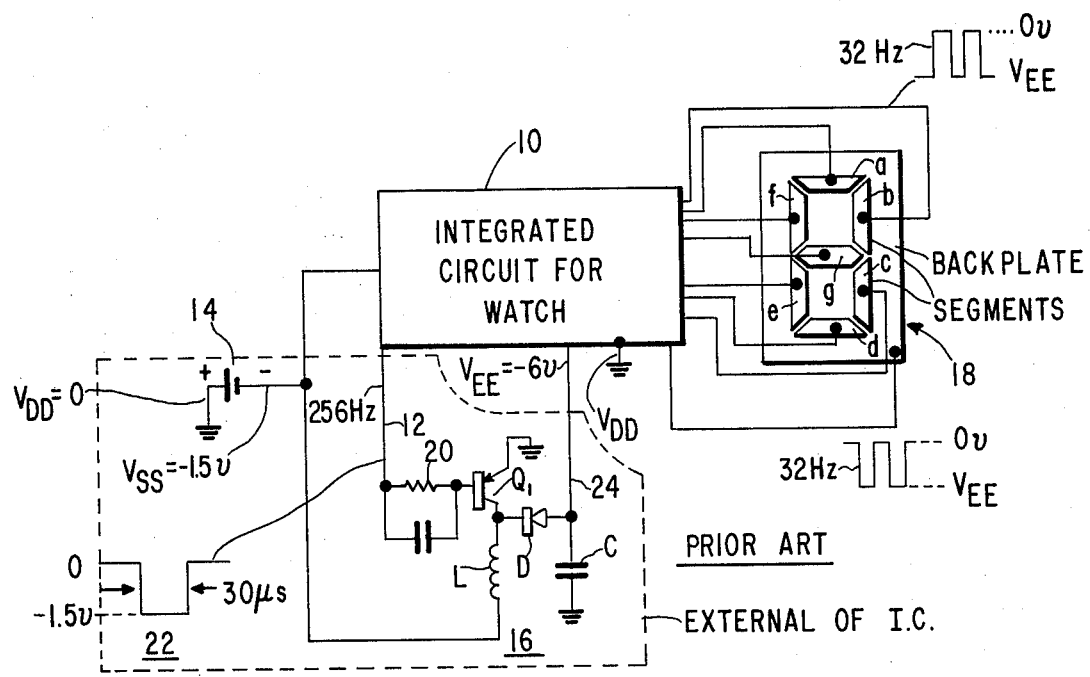
FIG. 1 is a block circuit diagram of a prior art liquid crystal display and driver circuit.

The problem dealt with in the present application is illustrated in the prior art system of FIG. 1. Integrated circuit 10 is commercially available from RCA Corporation and may be, for example, type TA 6478 (for field effect liquid crystal displays). Other commercially available alternatives employing one or more chips, for dynamic scattering or field effect liquid crystals, and employing somewhat higher operating voltages, may be used instead. The integrated circuit includes a 32.768 Khz. crystal oscillator which drives a frequency divider. The 256 Hz. output of this divider, after suitable shaping, appears on line 12. The divider is followed by a level shifter which is powered both by the 1.5 volt direct voltage provided by the battery 14, which in the case of a wristwatch may be a single silver oxide cell, and the −6 volts provided by the voltage converter 16.

The level shifted wave produced by the level shifter of the integrated circuit is applied to another divider circuit of the integrated circuit. The divider circuit produces the 0 to −6 volt low frequency driver voltage for the liquid crystal display. (The frequency may be, for example, 64 Hz. or 32 Hz. or less and in the integrated circuits given by way of example above is 32 Hz..) The divider produces the outputs which are counted and decoded within the integrated circuit and which are employed to control which of the segments will be "selected", as discussed shortly.

The display of the watch includes a plurality of numeric indicators, only one of which is illustrated at 18, and may also include other indicators such as colons, periods, letters and so on. Each numeric indicator includes a backplate and seven segments with liquid crystal between the backplate and the segments. There may be three numeric indicators and a colon between the first and second of these indicators or there may be four or more numeric indicators.

The −6 volts needed for the operation of the driver transistor for the liquid crystal display, which transistors are within the integrated circuit, are produced by the DC to DC voltage converter 16. It is located external of the chip. It includes a PNP transister $Q_1$, an inductor L connected between the collector electrode of the transistor and the negative terminal of the battery 14, a storage capacitor C connected at one terminal to $V_{DD}$ (ground) and a diode connected at its cathode to the collector of the transistor and at its anode to the other terminal of the capacitor.

In the operation of the voltage converter, 30 usec pulses at a 256 Hz pulse repetition frequency are applied via the resistor-capacitor coupling network 20 to the base electrode of transistor $Q_1$. These pulses are derived from the crystal oscillator within the integrated circuit by a frequency divider and wave shaper within the integrated circuit. Each time the pulse occurs, that is, each time the wave goes negative to −1.5 volts, the transistor turns on and current is applied to the inductor L. This causes a magnetic field to be produced around the inductor. When the wave 22 goes relatively positive (that is, when it returns to ground potential), transistor $Q_1$ cuts off. The capacitor C now supplies current to the inductor L through the diode D in a sense to tend to prevent the magnetic field around the inductor from collapsing. The result is to charge the capacitor negatively. The amplitude of the resulting voltage across the capacitor will depend upon the values of the inductance, capacitance and resistance in the circuit and these are chosen, in the present example, to provide a direct voltage of −6 volts across the capacitance. In other applications the voltage may be −10 or −15 volts or more and, of course, may be either positive or negative.

As already mentioned, the −6 volts appearing across the capacitor is employed as a direct current operating voltage for the transistor driver circuits for the display. Each backplate may receive the 0 to −6 volt unipolarity alternating voltage continuously. The respective segments, on the other hand, will receive a 0 to −6 volt unipolarity voltage which is either in phase with or out of phase with the backplate voltage. For example, assume that the numeric indicator 18 illustrated is one of the hours indicators for the watch and that it is desired to display the numeral 3. In this case the backplate receives the low frequency (32 Hz) drive signal as shown and the segments e and f receive a low frequency (32 Hz) voltage which is in phase with the backplate voltage. The remaining segments a, b, c, d and g receive a low frequency (32 Hz) voltage which is 180° out of phase with the backplate voltage. The result is the simulation of a 12 volt bipolar alternating voltage across the liquid crystal at segments, a, b, c, d and g and zero volts appears across the liquid crystal the segments e and f. The 12 volt excitation causes the liquid crystal, in the event that it is of the dynamic scattering type, to become excited and to scatter light and in the event that it is of the field effect type, to change the plane of polarization of the light, all as well understood in the art. It is also to be understood that other types of liquid crystal which in the excited state is dark and in the unexcited state is clear may be used instead.

It sometimes occurs in the system of FIG. 1 that the battery supply voltage $V_{SS}$ decreases sufficiently that the oscillator within the integrated circuit 10 goes off. However, the battery is not completely dead at this time. The voltage $V_{SS}$ may, for example, still be at −1.3 or −1.4 volts. When the oscillator goes off, the wave 22 goes to zero and transistor $Q_1$ cuts off. Within a short time the capacitor C discharges and this presents no problem. However, note that the battery connects through the inductor L and the diode D to the integrated circuit. Therefore, the voltage on line 24, which was formerly $V_{EE}$, −6 volts, is now equal to the battery voltage minus the voltage drop across diode D. Assuming the battery voltage to be −1.4 volts and the drop across the diode to be 0.6 volt, the voltage at point 24 will be −0.8 volt. This static voltage is applied across the liquid crystal between the selected segments and each backplate (in the manner discussed in more detail later in connection with FIG. 3). While this voltage is of low value, if left on for a sufficient interval of time it may damage or destroy the liquid crystal.

Figure 2:
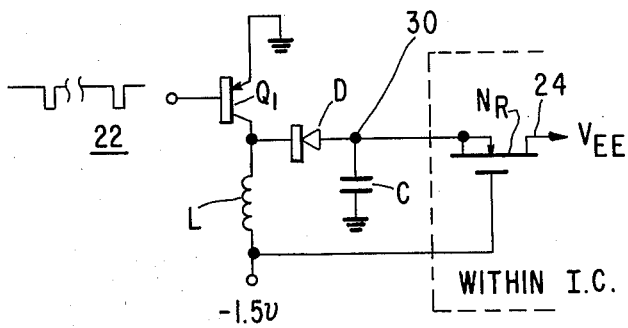
FIG. 2 is a schematic circuit diagram illustrating the improvement of the present invention.

The circuit of FIG. 2 illustrates the solution of a preferred embodiment of the present invention to the problem above. This circuit includes an N type MOS transistor $N_R$ connected at its source electrode to the capacitor C and the anode of diode D and connected at its drain electrode to the line 24 which connects to the integrated circuit 10. The gate electrode of transistor $N_R$ is connected to the −1.5 volt battery terminal. The transistor $N_R$ is quite small and, in practice, is located within the integrated circuit 10.

In the operation of the circuit of FIG. 2, when the oscillator is on, the voltage developed between the −1.5 volt terminal and the terminal of the capacitor at connection 30 maintains the transistor $N_R$ forward biased. The voltage developed at the source electrode connection 30 is −6 volts, as already indicated. The voltage at the gate electrode is −1.5 volts. The gate-to-source voltage therefore is +4.5 volts (that is, the gate electrode is 4.5 volts more positive than the source electrode voltage) and this is considerably in excess of the threshold voltage $V_T$ of the transistor. Accordingly, the transistor conducts. The design is such that the conduction path impedance at this forward bias voltage level is very low so that substantially the same −6 volt as appears at node 30 appears also on line 24.

When the battery voltage drops sufficiently, the oscillator goes off. This terminates the pulses 22 applied to the base electrode of transistor $Q_1$ and the latter goes off. Assuming the battery voltage to be reduced to −1.4 volts, the capacitor discharges until the voltage at point 30 reaches the value −1.4 volts + 0.6 volt = −0.8 volt (where 0.6 volt is the voltage across diode D). This 0.8 volt is more positive than the voltage −1.4 volts appearing at the gate electrode. In other words, the transistor $N_R$ is now reverse biased and cuts off. This disconnects the −0.8 volt appearing across capacitor C from the integrated circuit and more particularly from the liquid crystal driver transistors for the liquid crystal.

Figure 3:
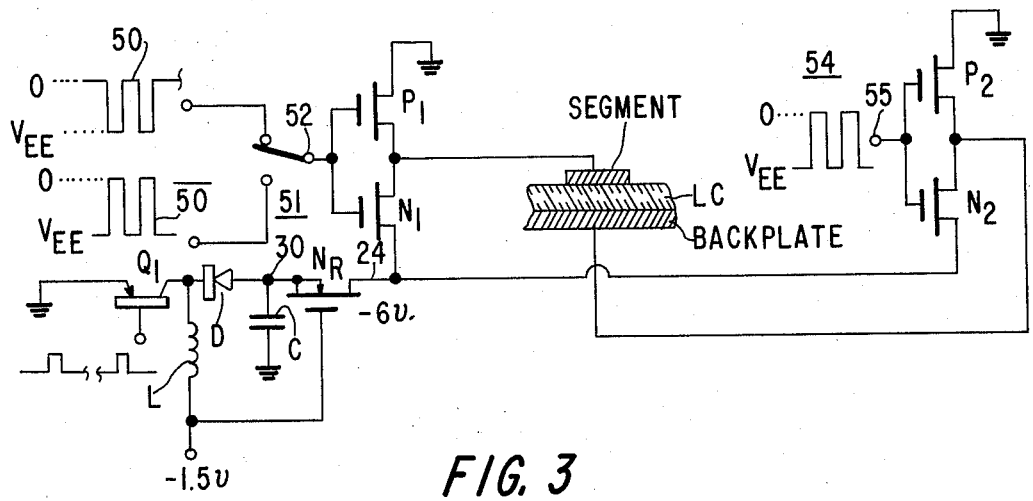
FIG. 3 is a more detailed showing of a portion of the system of FIG. 1 interconnected to the circuit of FIG. 2.

A typical drive circuit (within an integrated circuit such as 10) for one segment of the display is shown in FIG. 3. It includes two complementary symmetry metal oxide semiconductor (COS/MOS) inverter drivers $P_1$, $N_1$ and $P_2$, $N_2$, respectively. The N type transistors $N_1$ and $N_2$ connect at their source electrodes to the drain electrode of transistor $N_R$ and the P type transistors $P_1$ and $P_2$ connect at their source electrodes to $V_{DD}$ (ground). Each inverter ordinarily receives at its common gate electrode connection (its input terminal) a level shifted low frequency signal having an amplitude of −6 volts. The common drain connection of inverter $P_1$, $N_1$ connects to one of the segments and the common drain connection of inverter $P_2$, $N_2$ connects to the backplate of the liquid crystal numeric indicator. The switch 51, in practice, comprises MOS transmission gates.

In the position of the switch shown, it applies the 32 Hz wave 50 to input terminal 52. This wave is complementary to the 32 Hz wave 54 applied to input terminal 55. Thus the segment shown is a "selected" segment in the sense that in normal operation it will receive a voltage 180° out of phase with the voltage applied to the backplate and an alternating voltage of amplitude substantially equal to 2 $V_{EE}$ will appear across and excite the liquid crystal. When switch 51 is in its other position, the wave $\overline{50}$ which is in phase with the wave 54 is applied to terminal 52. This is a non-selected condition for the segment shown since the voltage across the liquid crystal between this segment and the backplate will be zero volts.

In the operation of the circuit and in the absence of transistor $N_R$, assume that when the oscillator goes off, the wave 50 applied through switch 51 is at ground level and the wave 54 applied to terminal 55 of inverter $P_2$, $N_2$ is at $V_{EE}$ level. The $V_{EE}$ level will reduce to −0.8 volt. However, this is still sufficient to maintain transistor $P_2$ on. Thus, the backplate is at close to ground level. The zero volts applied to terminal 52 maintains transistor $N_1$ on so that the −0.8 volt appears at the segment. Thus, −0.8 volt appears across the liquid crystal and, as already stated, this reduces the life of the liquid crystal.

It can be shown by similar analysis that with the switch 51 in the position shown and in the absence of transistor $N_R$, a static direct voltage will develop across the liquid crystal if the voltage at terminal 52 remains at $V_{EE}$ and that at terminal 55 is at ground level.

With the protection circuit comprising transistor $N_R$ present, as soon as the oscillations cease and the transistor $Q_1$ cuts off, the capacitor C discharges, mainly through diode D and inductor L. When sufficient discharge has occurred to reduce the source-to-gate voltage of transistor $N_R$ to a value lower than its threshold value $V_T$, transistor $N_R$ cuts off and disconnects node 30 from line 24. The capacitor C continues to discharge through the inductor until node 30 reaches the voltage $V_{SS}$-$V_D$, where $V_{SS}$ may be 1.4 volts or less and $V_D$, the voltage across diode D, is about 0.6 volt. As already mentioned, at these voltage levels transistor $N_R$ is reverse biased to the extent of 0.8 volt or so and remains cut off.

The static charge which may be present at nodes in the circuit after transistor $N_R$ cuts off, such as the common drain electrode connection of transistors $P_1$, $N_1$ or the common drain electrode connection of transistors $P_2$, $N_2$, soon dissipates. The nodes discharge within a very short time through the resistance of the liquid crystal and cause no significant effect on the life of the liquid crystal.

A feature of the circuit is the quick build-up of voltage across the capacitor C when the converter initially is energized. Transistor $N_R$, at this time, is cut off so that the loud is disconnected from the storage capacitor. Thus the converter initially very quickly charges to the threshold voltage $V_T$ of transistor $N_R$ and this reduces the total time required for the capacitor to charge to the final D.C. level of −6 volts.

What is claimed is:

1. In combination:
   a first terminal at a point of reference potential:
   second and third terminals;
   a fourth terminal, this one for receiving an operating voltage;
   an inductor connected between said third and fourth terminals;
   a switch connected between said first and third terminals, whereby each time said switch closes, current flows through said inductor;
   energy storage means connected between said first and second terminals;
   asymmetrically conducting means connected between said second and third terminals in a sense to cause current flow between said energy storage means and said inductor, thereby to tend to charge said energy storage means, each time said switch opens;
   load circuit means;
   a second switch connected between said load circuit means and said second terminal for supplying the voltage at said second terminal to said load circuit means when said second switch is closed; and
   means coupled to said second switch and responsive to the voltage between said fourth and second terminals for maintaining said second switch closed in response to a value of said voltage of greater than a given magnitude and for opening said second switch at other times.

2. In the combination as set forth in claim 1, said second switch comprising a transistor having a conduction path and a control electrode, said conduction path connected between said second terminal and said load circuit and said control electrode connected to said fourth terminal.

3. In the combination as set forth in claim 2, said transistor comprising a MOS transistor connected at its source electrode to said second terminal.

4. In a circuit which includes liquid crystal between a pair of conductors, driver transistors for applying unipolarity voltages to these conductors and a direct current operating voltage source for providing the operating voltage for said driver transistors, and which also includes a relatively low voltage source, a direct current converter operated by said low voltage source and by direct current pulses for converting said relatively low voltage to a relatively higher direct current voltage, said direct current converter serving as said direct current operating voltage source and said relatively higher voltage as said operating voltage for said driver transistors, said converter including an inductor direct current coupled between said relatively low voltage source and said driver transistors, and an energy storage means which is periodically charged by said inductor, the improvement comprising:
   a switch having a conduction path, said path direct current coupled between said inductor and said driver transistors and operating to conduct the voltage produced by said converter to said driver transistors; and
   means responsive to the voltage difference between the voltage produced by said relatively low voltage source and that produced by the charge stored in said energy storage means for maintaining said switch closed when said voltage difference exceeds a given value and for opening said switch when said voltage difference drops to lower than said given value.

5. In a circuit as set forth in claim 4, said switch comprising the conduction path of a field effect transistor, said path direct current coupled at its source electrode end to said inductor, and said means responsive to said voltage difference comprising the source-to-gate electrode input circuit of said transistor, said gate electrode being connected to the other end of said inductor, that is, to the end of said inductor coupled to said low voltage source.

6. In a circuit as set forth in claim 5, the direct current coupling of said source electrode to said inductor including a diode poled to conduct the conduction path current of said field effect transistor in the forward direction.

* * * * *